United States Patent [19]
Inoue

[11] Patent Number: 5,765,383
[45] Date of Patent: Jun. 16, 1998

[54] AUTOMOBILE AIR-CONDITIONER HAVING IMPROVED CONTROL CHARACTERISTICS

[75] Inventor: Atsuo Inoue, Sawa-gun, Japan

[73] Assignee: Sanden Corporation, Japan

[21] Appl. No.: 841,645

[22] Filed: Apr. 30, 1997

[30] Foreign Application Priority Data

May 1, 1996 [JP] Japan .................. 8-135851

[51] Int. Cl.$^6$ .................. F25B 41/00; F25B 1/00
[52] U.S. Cl. .................. 62/209; 62/228.4; 62/229
[58] Field of Search .................. 62/228.4, 229, 62/209; 236/78 D, 91

[56] References Cited

U.S. PATENT DOCUMENTS

| | | | |
|---|---|---|---|
| 5,634,348 | 6/1997 | Ikeda et al. ........ | 62/229 X |
| 5,669,226 | 9/1997 | Kurahashi et al. ........ | 62/229 X |

*Primary Examiner*—William E. Wayner
*Attorney, Agent, or Firm*—Baker & Botts, L.L.P.

[57] ABSTRACT

In an automobile air-conditioner comprising a compressor with variable discharge capacity for compressing a refrigerant, an outlet temperature sensor for sensing an outlet temperature at an outlet of at least one of a heat sink and a radiator, a room temperature sensor for sensing a room temperature inside the automobile, an outside air temperature sensor for sensing an outside air temperature outside the automobile, and a room temperature setting unit for setting the room temperature to a desired temperature, a first arithmetic operating unit carries out an arithmetic operation according to at least the room temperature, the outside air temperature, and the desired temperature, to obtain a target temperature. A second arithmetic operating unit predicts the rotation speed of the compressor with a predetermined feed-forward arithmetic expression to obtain a predicted rotation speed. A third arithmetic operating unit carries out an arithmetic operation with an arithmetic feedback control expression including the predicted rotation speed and a deviation between the target temperature and the outlet temperature to obtain the rotation speed of the compressor. The compressor is controlled in accordance with the rotation speed calculated by the third arithmetic operating unit.

6 Claims, 13 Drawing Sheets

AUTOMOBILE AIR-CONDITIONER HAVING IMPROVED CONTROL CHARACTERISTICS

BACKGROUND OF THE INVENTION

The present invention relates to an automobile air-conditioner and, more particularly, to an automobile air-conditioner which has a refrigerant circulation circuit comprising a compressor with variable discharge capacity.

An automobile air-conditioner of the type described comprises a compressor with variable discharge capacity for compressing a refrigerant and a refrigerant circulation circuit including at least one of a heat sink adapted to absorb heat during cooling and a radiator adapted to provide heat transfer to objects during heating. The heat sink and the radiator are called an evaporator and a condenser, respectively, and are located in a ventilation duct.

The automobile air-conditioner controls the temperature inside an automobile in the following manner. A temperature sensor is placed at an outlet of the heat sink or the radiator to sense an outlet temperature. A rotation speed Nc of the compressor is controlled such that the outlet temperature sensed by the temperature sensor matches a target temperature. This control is carried out by control action, proportional plus integral (P.I.) with an arithmetic feedback expression described below.

The P.I. control has following drawbacks. It requires a longer response time since the control of the rotation speed Nc of the compressor relies only on the arithmetic feedback expression. For example, the automobile air-conditioner has a low response speed to a change in quantity of solar radiation. This means a response speed is low to any disturbances including variation of the target temperature due to modification of a setting of the temperature inside the automobile.

The automobile air-conditioner becomes unstable under a light load, which may cause hunting, when a gain for the P.I. control is adjusted to obtain good control characteristics under a moderate or a heavy load. Fluctuation of a heat load due to a change in the ambient temperature changes the characteristics of a refrigerating cycle of the refrigerant circulation circuit. On the contrary, the response speed is deteriorated under the moderate or the heavy load when the gain is adjusted to obtain good control characteristics under the light load.

SUMMARY OF THE INVENTION

Therefore, an object of the present invention is to provide an automobile air-conditioner capable of improving response characteristic of control without any influence from disturbances, change in a target temperature and/or modification of setting of a temperature inside an automobile.

Another object of the present invention is to provide an automobile air-conditioner that ensures optimum control over a wide range of heat loads to provide stable control with a rapid response speed.

An automobile air-conditioner according to the present invention comprises a compressor with variable discharge capacity for compressing a refrigerant; a refrigerant circulation circuit placed in a ventilation duct and including at least one of a heat sink adapted to absorb heat during cooling and a radiator adapted to provide heat transfer to objects during heating; an outlet temperature sensor for sensing air temperature at an outlet of the at least one of the heat sink and the radiator as a sensed outlet temperature; a room temperature sensor for sensing the temperature inside the automobile as a sensed room temperature; an outside air temperature sensor for sensing the temperature outside the automobile as a sensed outside air temperature; and a room temperature setting unit for use in setting the room temperature to a desired temperature.

According to an aspect of the present invention, the automobile air-conditioner comprises a first arithmetic operating unit that carries out an arithmetic operation according to at least the sensed room temperature, the sensed outside air temperature, and the desired temperature, to obtain a target temperature; a second arithmetic operating unit that carries out an arithmetic operation for predicting the rotation speed of the compressor with a predetermined feed-forward arithmetic expression to obtain a predicted rotation speed; and a third arithmetic operating unit that carries out an arithmetic operation with an arithmetic feedback control expression including the predicted rotation speed and a deviation between the target temperature and the sensed outlet temperature to obtain the rotation speed of the compressor. The compressor is controlled according to the rotation speed calculated by the third arithmetic operating unit.

DESCRIPTION OF THE PREFERRED EMBODIMENT

Figure 1:
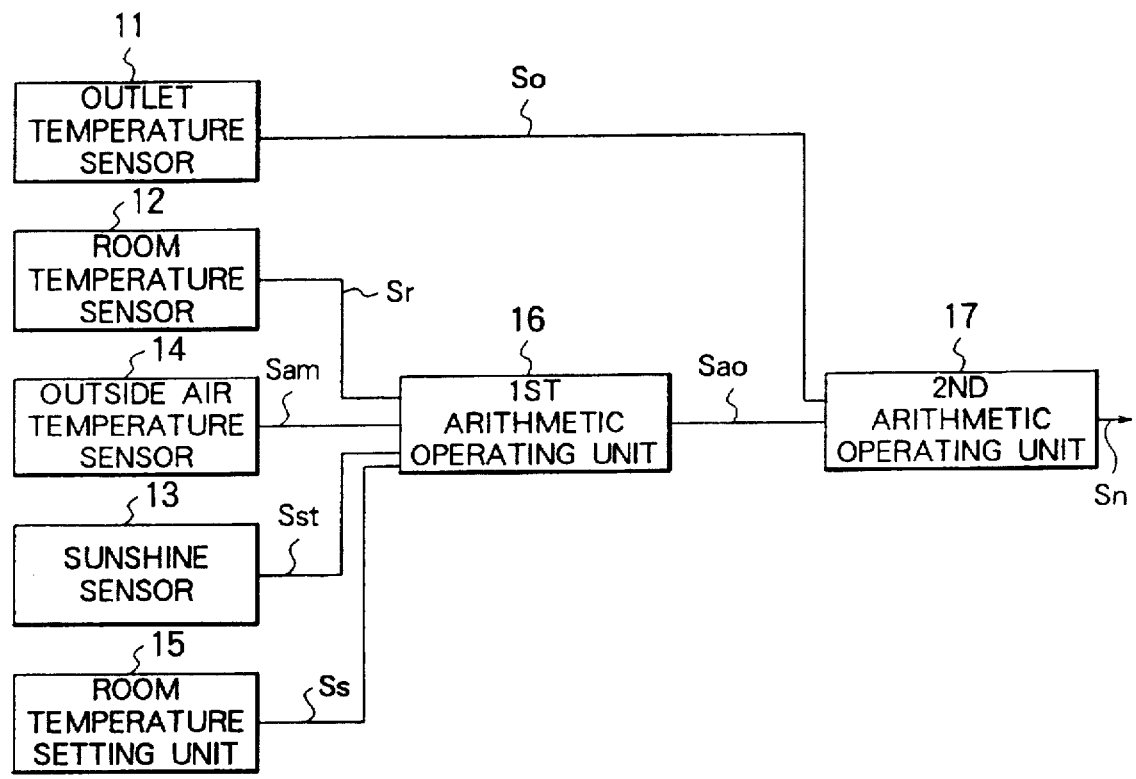
FIG. 1 is a block diagram of a control unit for a conventional automobile air-conditioner.

Referring to FIG. 1, description is made on the control carried out by a conventional automobile air-conditioner for the purpose of facilitating the understanding of the present invention. An outlet temperature sensor 11 is placed at an outlet of a heat sink or a radiator to sense the air temperature at the outlet. A room temperature sensor 12 and a sunshine sensor 13 are placed inside an automobile to sense the air temperature inside the automobile and the quantity of solar radiation, respectively. An outside air temperature sensor 14 is placed outside the automobile to sense the air temperature outside the automobile. Furthermore, a room temperature setting unit 15 is also provided to set the temperature inside the automobile.

The outlet temperature sensor 11 senses an outlet temperature TO and produces a sensor signal So indicative of the outlet temperature TO. The room temperature sensor 12 senses a room temperature Tr and produces a sensor signal Sr indicative of the room temperature Tr. The sunshine sensor 13 senses a quantity of solar radiation Tst and produces a sensor signal Sst indicative of the quantity of the solar radiation Sst. The outside air temperature sensor 14 senses an outside air temperature Tam and produces a sensor signal Sam indicative of the outside air temperature Tam. The room temperature setting unit 15 produces a setting signal Ss indicative of a set temperature Ts.

The sensor signals Sr, Sam, and Sst and the setting signal Ss are supplied to a first arithmetic operating unit 16. The first arithmetic operating unit 16 calculates a target temperature TAO according to the following equation and produces a signal Sao indicative of the calculated target temperature TAO:

$$TAO = Ks \cdot Ts - Kr \cdot Tr - Kam \cdot Tam - Kst \cdot Tst + C,$$

wherein Ks, Kr, Kam, and Kst represent coefficients while C represents a correction constant.

A second arithmetic operating unit 17 calculates a rotation speed Nc of a compressor according to the following arithmetic feedback expression in response to the signal Sao indicative of the calculated target temperature TAO and the sensor signal So. The second arithmetic operating unit 17 then produces a signal Sn indicative of the calculated rotation speed Nc:

$$Nc = \pm P(P \text{ component}) + I(I \text{ component})$$
$$= \pm Kpc(TO - TAO) + I_n,$$

provided that $I_n = I_{n-1} \pm G \cdot Kpc \cdot \Delta t / Ki(TO - TAO)$, wherein Kpc represents a fundamental gain in the arithmetic feedback expression while G represents a correction gain in the arithmetic feedback expression, $\Delta t$ represents a control cycle, Ki represents an integration time in the arithmetic feedback expression, and $I_{n-1}$ represents a previous value of a calculated integration. The sign ± means that a plus sign (+) is used during cooling and a minus sign (−) is used during heating.

This control process has the following drawbacks. The P.I. control has following drawbacks. It requires a longer response time since the control of the rotation speed Nc of the compressor relies only on the arithmetic feedback expression. For example, the automobile air-conditioner has a low response speed to a change in quantity of solar radiation. This means a response speed is low to any disturbances including variation of the target temperature due to modification of a setting of the temperature inside the automobile. This is also true when an air quantity in a blower that supplies air to the heat sink or the radiator is changed. Ventilation ducts of the automobile allow switching the passages of the air between for the outside air and the inside air. Upon switching, the temperature of the air through the ventilation duct changes and the above-mentioned problem thus arises.

The automobile air-conditioner becomes unstable under a light load, which may cause hunting, when a gain for the P.I. control is adjusted to obtain good control characteristics under a moderate or a heavy load. Fluctuation of a heat load due to a change in the ambient temperature changes the characteristics of a refrigerating cycle of the refrigerant circulation circuit. On the contrary, the response characteristic is deteriorated under the moderate or the heavy load when the gain is adjusted to obtain good control characteristics under the light load.

Figure 2:
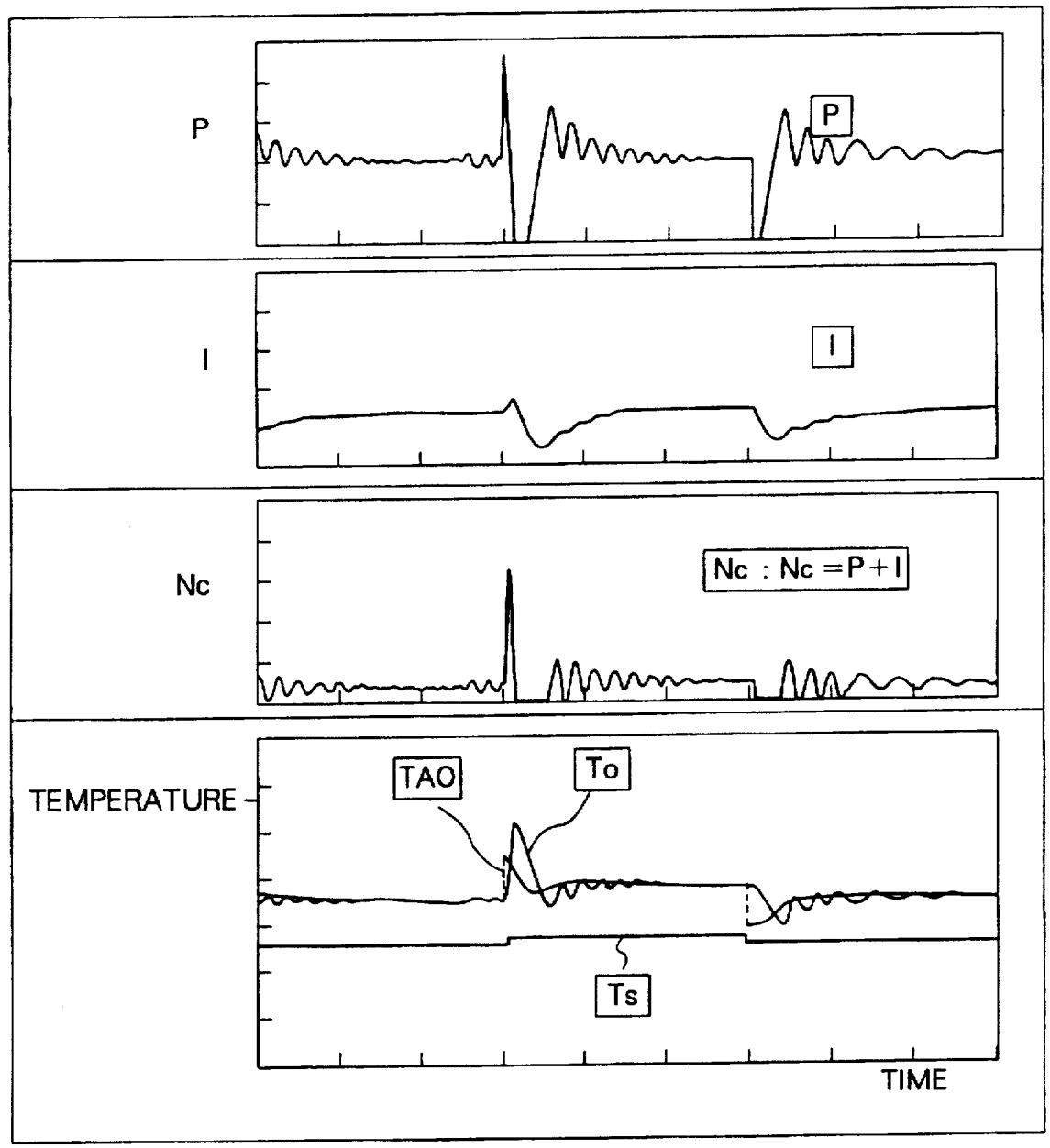
FIG. 2 illustrates characteristic curves for use in describing an example of control carried out by the control unit in FIG. 1 when the automobile air-conditioner is operated under a light load for heating.

Referring to FIG. 2, description is made on an example of control carried out when the automobile air-conditioner is operated under the light load for heating with the gain adjusted giving the importance on the response characteristic under the heavy load. The rotation speed Nc of the compressor as well as the outlet temperature TO are unstable and hunting is caused. This tends to occur upon modification of the set temperature or starting the operation.

Figure 3:
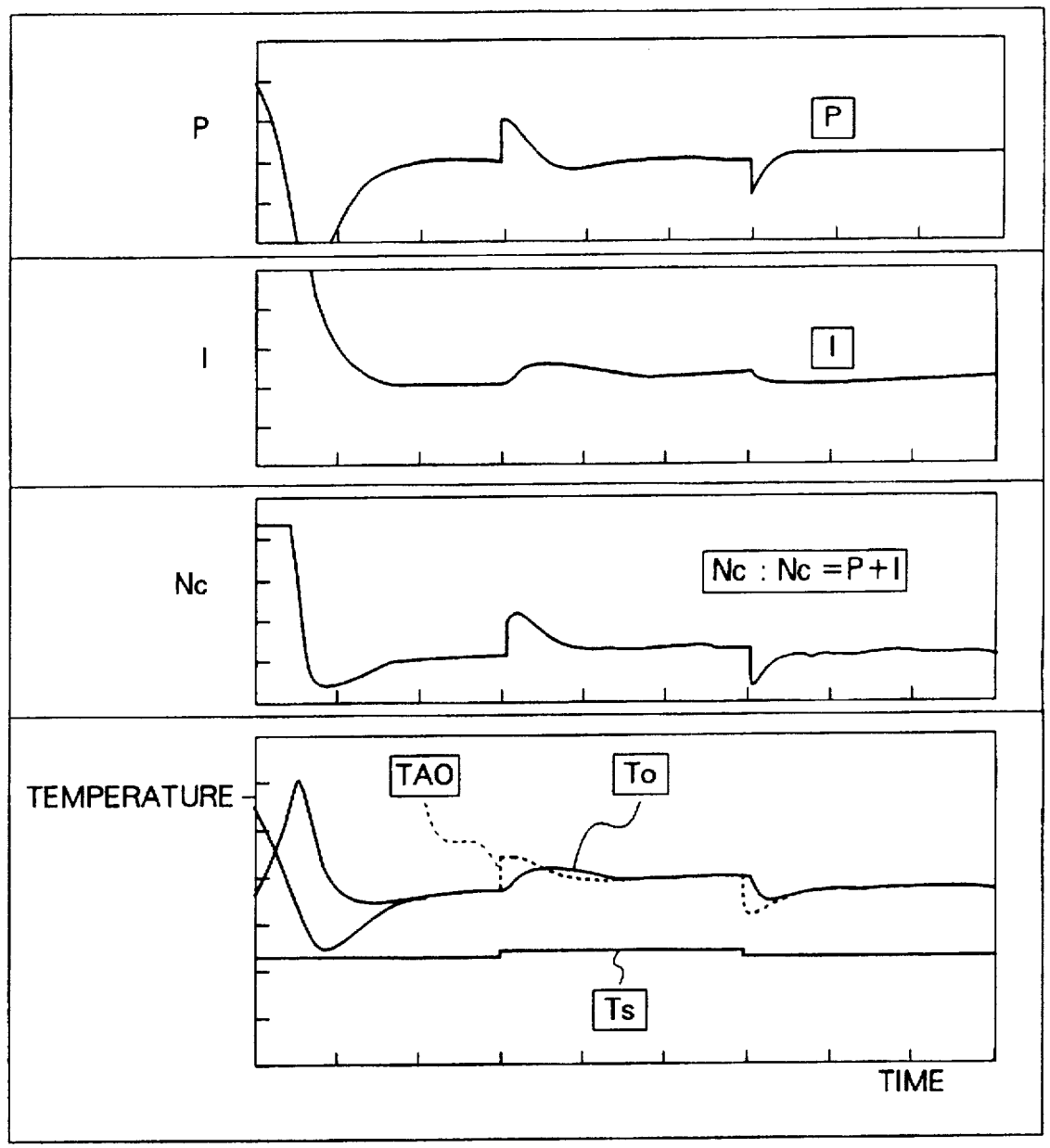
FIG. 3 illustrates characteristic curves for use in describing another example of control carried out by the control unit in FIG. 1 when the automobile air-conditioner is operated under a heavy load for heating.

Referring to FIG. 3, description is made on an example of control carried out when the automobile air-conditioner is operated under the heavy load for heating with the gain adjusted giving the importance on the response characteristic under the light load. It requires a certain period of time for the rotation speed Nc of the compressor and the outlet temperature TO to reach the target temperature, which indicates a low response speed. This tends to occur upon modification of the set temperature or starting the operation.

Figure 4:
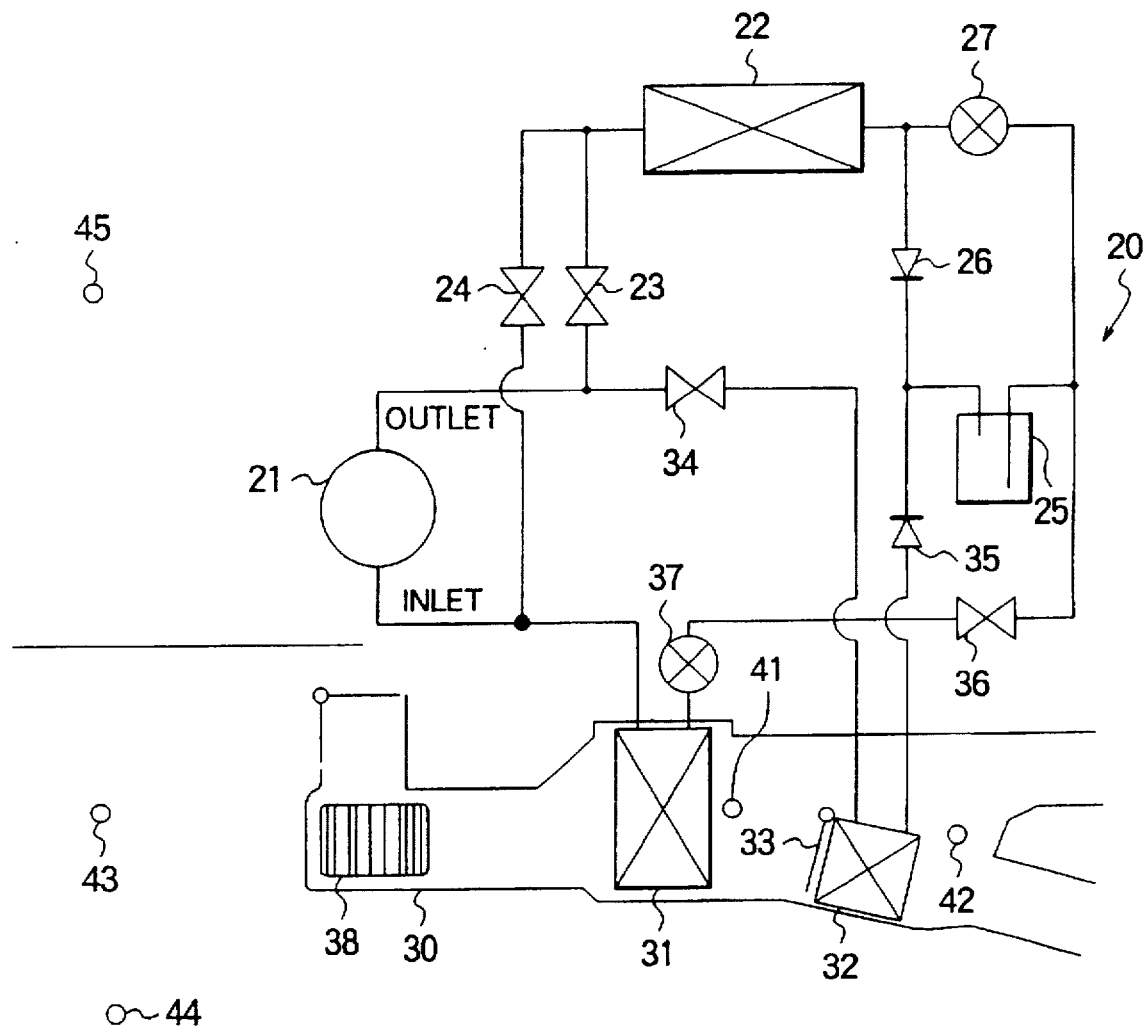
FIG. 4 is a schematic structural view of a refrigerant circulation circuit of an automobile air-conditioner according to a preferred embodiment of the present invention.

Now, with reference to FIGS. 4 to 9, an automobile air-conditioner according to a preferred embodiment of the present invention is described. In FIG. 4, the automobile air-conditioner comprises a refrigerant circulation circuit 20. The refrigerant circulation circuit 20 comprises a number of components that are divided into two groups, one being placed outside the automobile and the other inside the automobile.

Components placed outside the automobile are described first. The refrigerant circulation circuit 20 comprises a compressor 21 which is driven by a rotation-driving source (not shown). A discharge capacity of the compressor 21 is controlled by the rotation speed of the rotation-driving source. A discharge port of the compressor 21 is connected to an inlet of an outdoor heat exchanger 22 through a solenoid valve 23. A suction port of the compressor 21 is connected to an inlet of the outdoor heat exchanger 22 through a solenoid valve 24. An outlet of the outdoor heat exchanger 22 is connected to an inlet of a receiver tank 25 through a check valve 26. The outlet of the outdoor heat exchanger 22 is also connected to an outlet of the receiver tank 25 through an expansion valve 27.

Components placed inside the automobile are described. The automobile air-conditioner comprises a ventilation duct 30. The ventilation duct 30 is provided with an evaporator 31 and a condenser 32 placed therein. The evaporator 31 serves as a heat sink that absorbs heat during cooling. The condenser 32 serves as a radiator that provides heat transfer to objects during heating. In this embodiment, a damper 33 is disposed upstream of the condenser 32 to control the passage of the air into the condenser 32.

The discharge port of the compressor 21 is also connected to an inlet of the condenser 32 through a solenoid valve 34. An outlet of the condenser 32 is connected to the inlet of the receiver tank 25 through a check valve 35. An inlet of the evaporator 31 is connected to the outlet of the receiver tank 25 through a solenoid valve 36 and an expansion valve 37. An outlet of the evaporator 31 is connected to the suction port of the compressor 21.

The evaporator 31 and the condenser 32 are placed in the ventilation duct 30 in this embodiment to allow both cooling and heating by the automobile air-conditioner. However, the present invention is applicable to the automobile air-conditioner having either one of the evaporator 31 and the condenser 32.

A first outlet temperature sensor 41 and a second outlet temperature sensor 42 are placed in the ventilation duct 30 to sense the air temperature at the outlets of the evaporator 31 and the condenser 32, respectively. The ventilation duct 30 is also provided with a blower 38 placed therein that takes the air into the ventilation duct 30 and forces it to the room of the automobile through the evaporator 31 and the condenser 32.

A room temperature sensor 43 and a sunshine sensor 44 are disposed inside the automobile to sense the room temperature of the automobile and the quantity of solar radiation, respectively. An outside air temperature sensor 45 is disposed outside the automobile to sense the air temperature outside the automobile. Though not being illustrated, the automobile air-conditioner also comprises a room temperature setting unit for use in setting a room temperature to be controlled.

Next, description is made on air-conditioning cycles for the automobile air-conditioner of the present invention. This automobile air-conditioner can generally be operated in one of five air-conditioning cycles: a cooling cycle, a heating cycle, a dehumidification/cooling cycle, a dehumidification/heating cycle, and an internal cycle.

Figure 5:
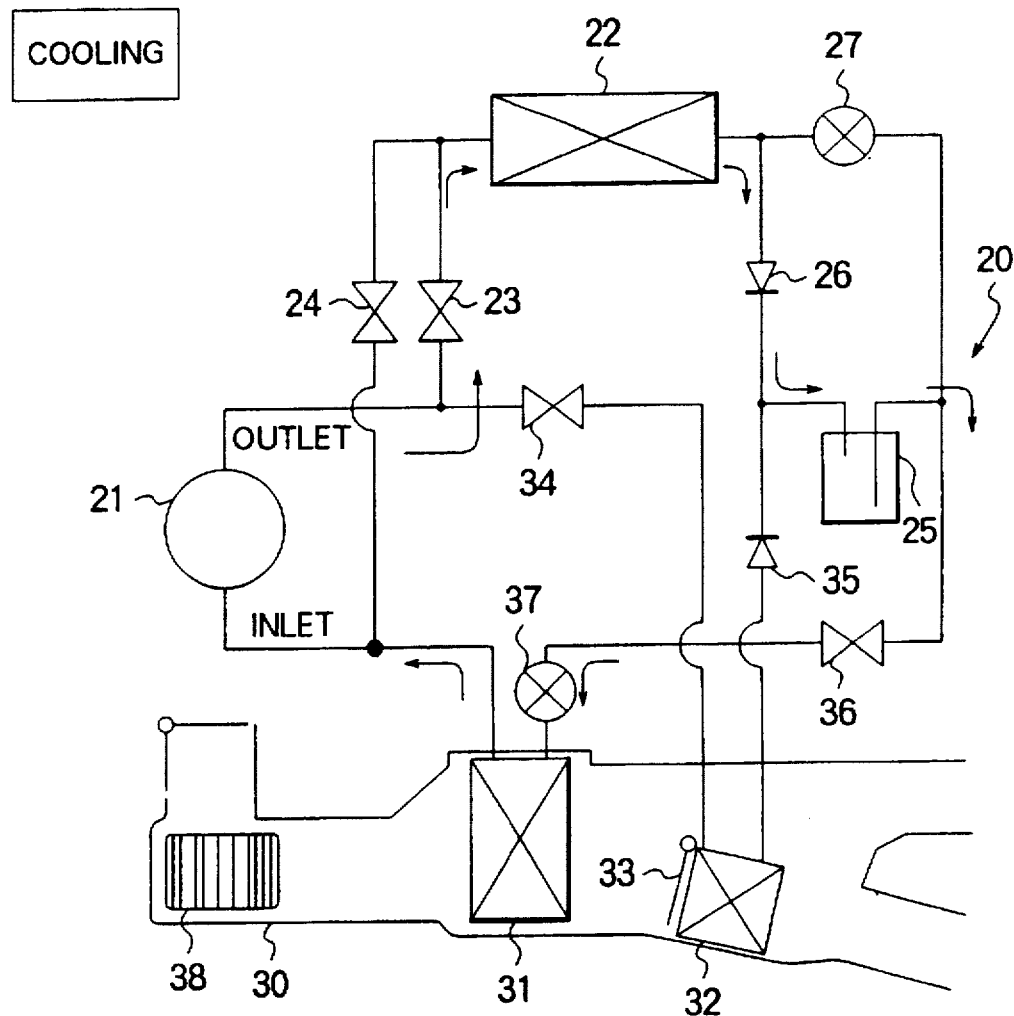
FIG. 5 is a schematic structural view of the refrigerant circulation circuit in FIG. 4 operated in a cooling cycle.

As shown in FIG. 5 in which the automobile air-conditioner is operated in the cooling cycle, the damper 33 in the ventilation duct 30 is completely closed to prevent the air supplied by the blower 38 from passing through the condenser 32. In the cooling cycle, the refrigerant compressed by the compressor 21 reaches the expansion valve 37 through the solenoid valve 23, the outdoor heat exchanger 22, the check valve 26, the receiver tank 25, and the solenoid valve 36 in this order. The outdoor heat exchanger 22 serves as a condenser. The refrigerant expands at the expansion valve 37. The expanded refrigerant vaporizes at the evaporator 31, absorbing heat and cooling the air. The vaporized refrigerant is returned to the compressor 21 and compressed there again.

Figure 6:
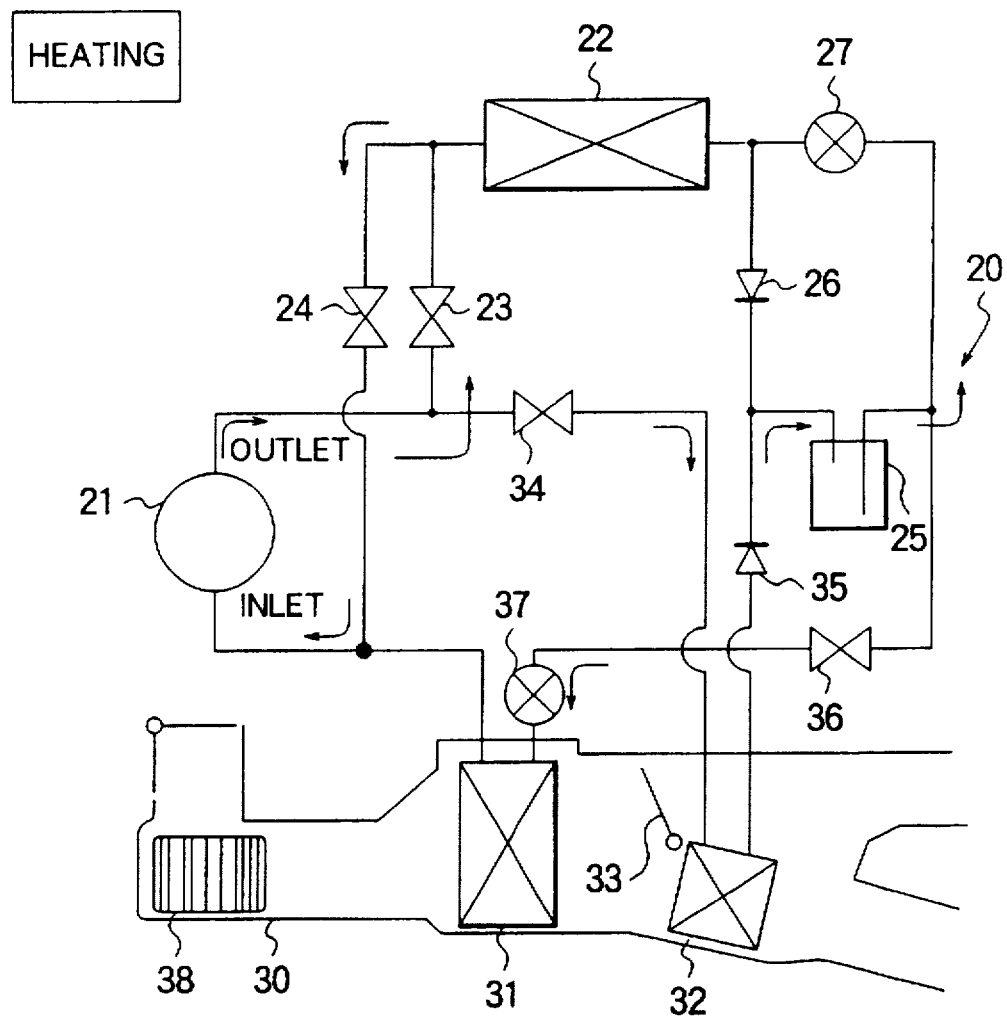
FIG. 6 is a schematic structural view of the refrigerant circulation circuit in FIG. 4 operated in a heating cycle.

As shown in FIG. 6 in which the automobile air-conditioner is operated in the heating cycle, the damper 33 is completely opened to allow the air supplied by the blower 38 to pass through the condenser 32. In the heating cycle, the refrigerant compressed by the compressor 21 circulates through the solenoid valve 34, the condenser 32, the check valve 35, the receiver tank 25, the expansion valve 27, the outdoor heat exchanger 22, and the solenoid valve 24 in this order. At the condenser 32 the compressed refrigerant dissipates or gives off the heat. The air passing through the condenser 32 is heated accordingly. The refrigerant after the dissipation of heat vaporizes at the outdoor heat exchanger 22 and is returned to the compressor 21.

Figure 7:
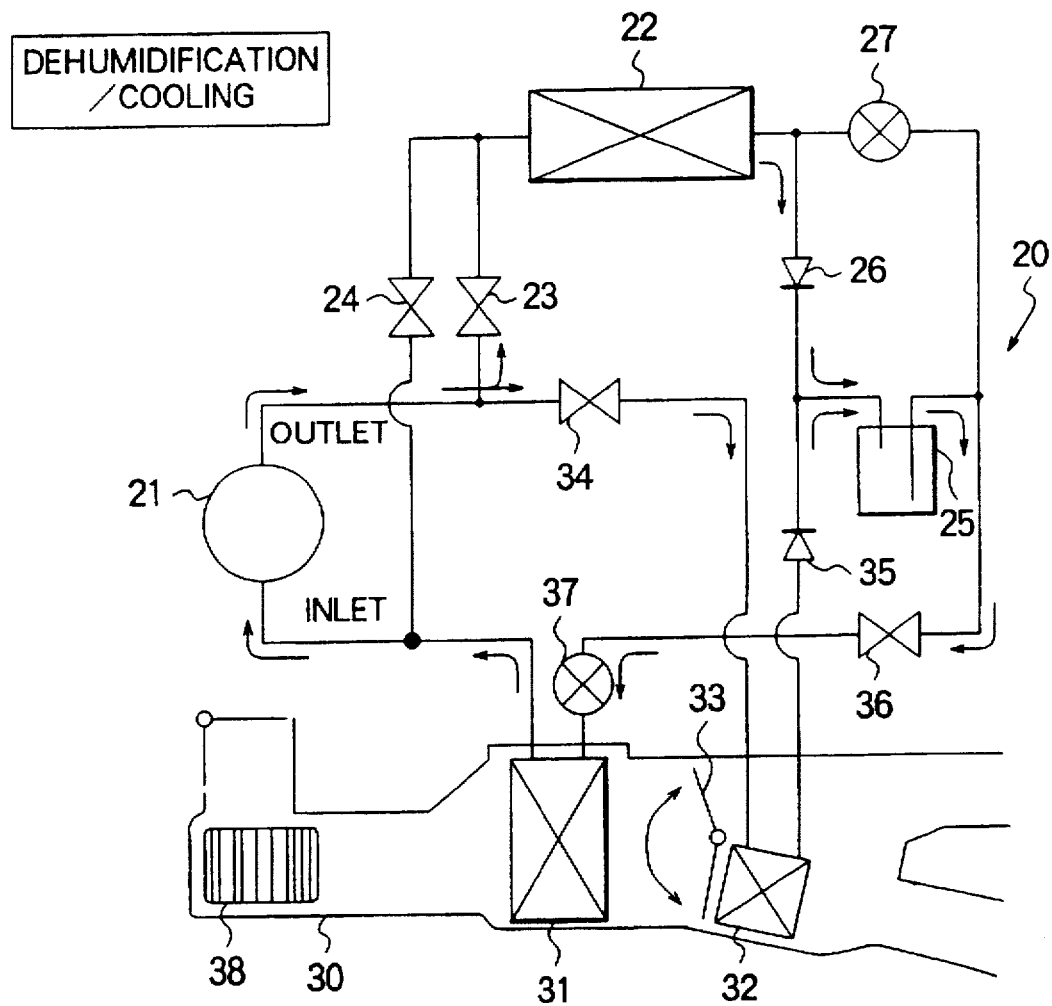
FIG. 7 is a schematic structural view of the refrigerant circulation circuit in FIG. 4 operated in a dehumidification/cooling cycle.

As shown in FIG. 7 in which the air-conditioning system is operated in the dehumidification/cooling cycle, the damper 33 is half opened to allow a part of the air supplied by the blower 38 to pass through the condenser 32. In the dehumidification/cooling cycle, a part of the refrigerant compressed by the compressor 21 is supplied to the condenser 32 through the solenoid valve 34. The remainder of the compressed refrigerant is supplied to the outdoor heat exchanger 22 through the solenoid valve 23. At the condenser 32, the compressed refrigerant dissipates the heat. The compressed refrigerant at the outdoor heat exchanger 22 is condensed and supplied to the receiver tank 25 through the check valve 26. On the other hand, the refrigerant condensed by the compressor 32 is supplied to the receiver tank 25 through the check valve 35. The refrigerant out of the receiver tank 25 is supplied to the evaporator 31 through the solenoid valve 36 and the expansion valve 37. The refrigerant vaporizes at the evaporator 31, cooling and dehumidifying the air. The vaporized refrigerant from the evaporator 31 is supplied to the suction port of the compressor 21. In the dehumidification/cooling cycle, the outdoor heat exchanger 22 serves as a radiator in a well-known heat pump system. The automobile air-conditioner is thus operated in the dehumidification/cooling cycle because of the cooling and dehumidifying effects achieved by the evaporator 31 and the heating effect achieved by the condenser 32 in the ventilation duct 30.

Figure 8:
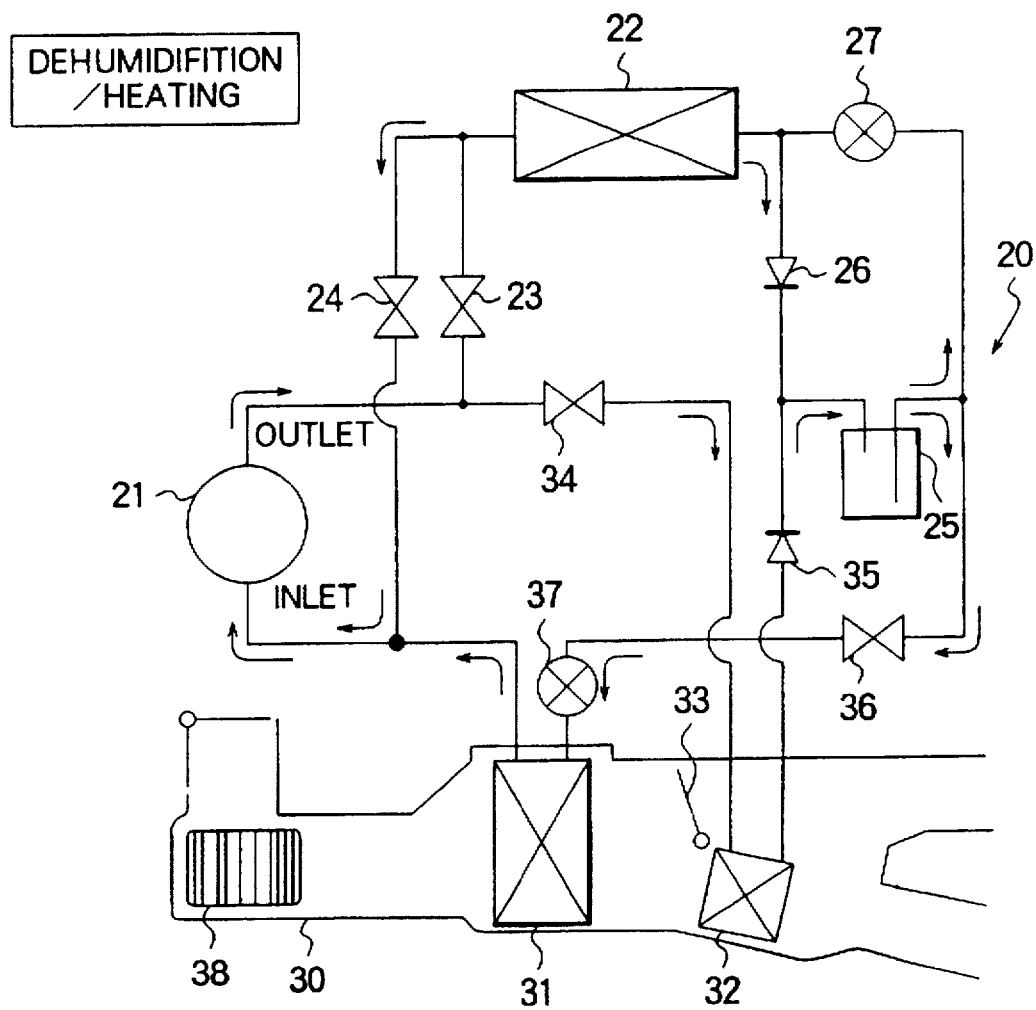
FIG. 8 is a schematic structural view of the refrigerant circulation circuit in FIG. 4 operated in a dehumidification/heating cycle.

As shown in FIG. 8 in which the automobile air-conditioner is operated in the dehumidification/heating cycle, the damper 33 is completely opened to allow the air supplied by the blower 38 to pass through the condenser 32. In the dehumidification/heating cycle, the refrigerant compressed by the compressor 21 is supplied to the condenser 32 through the solenoid valve 34. At the condenser 32, the compressed refrigerant dissipates or gives off the heat. The air passing through the condenser 32 is heated accordingly. The refrigerant out of the condenser 32 is then supplied to the receiver tank 25 through the check valve 35. A part of the refrigerant out of the receiver tank 25 is supplied to the evaporator 31 through the solenoid valve 36 and the expansion valve 37. The refrigerant vaporizes at the evaporator 31, dehumidifying the air. The remainder of the refrigerant is supplied to the outdoor heat exchanger 22 through the expansion valve 27. The refrigerant vaporizes at the outdoor heat exchanger 22. The refrigerant vaporized at the evaporator 31 is returned to the suction port of the compressor 21. The refrigerant vaporized at the outdoor heat exchanger 22 is returned to the suction port of the compressor 21 through the solenoid valve 24. In the dehumidification/heating cycle, the outdoor heat exchanger 22 serves as the heat sink in the heat pump system. The automobile air-conditioner is thus operated in the dehumidification/heating cycle because of the dehumidifying effects achieved by the evaporator 31 and the heating effect achieved by the condenser 32 in the ventilation duct 30.

Figure 9:
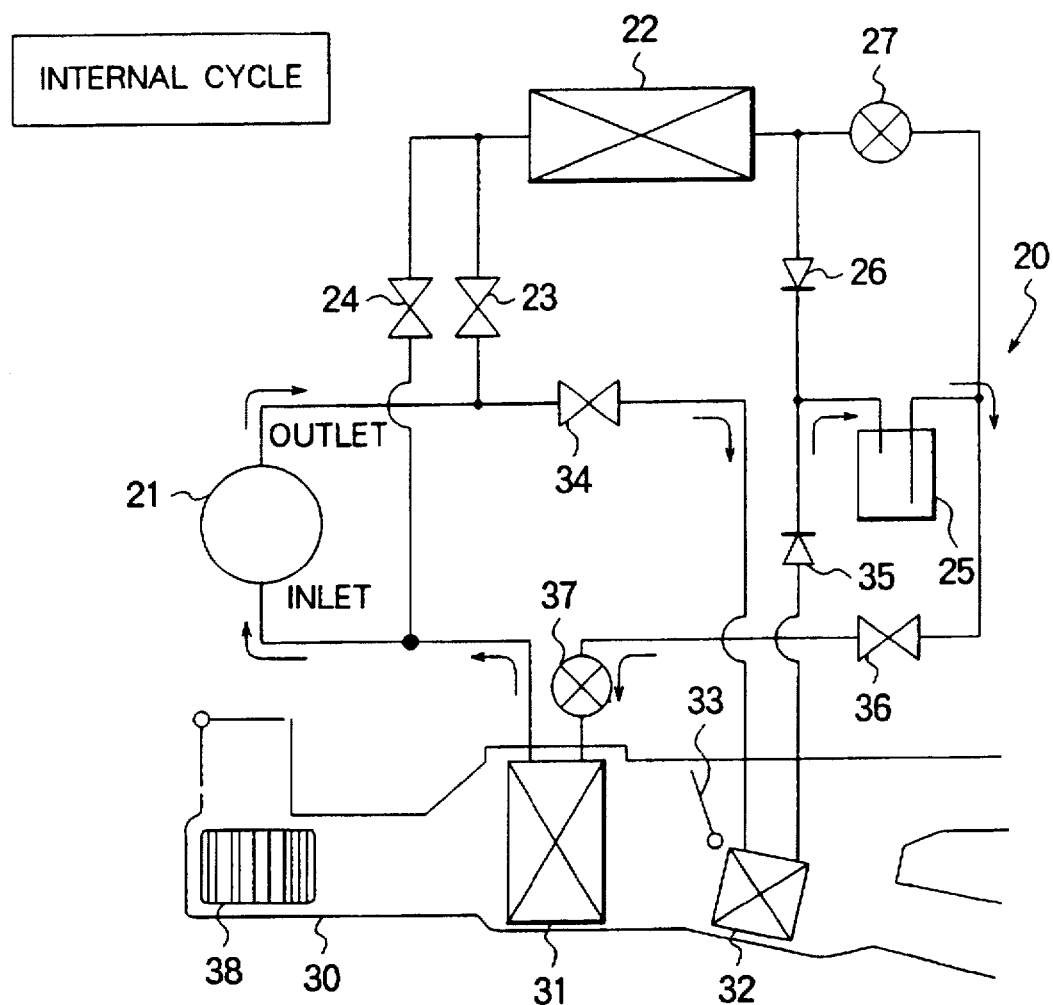
FIG. 9 is a schematic structural view of the refrigerant circulation circuit in FIG. 4 operated in an internal cycle.

In FIG. 9, the internal cycle is the one providing a higher dehumidification capacity and a lower heating capacity. In the internal cycle, the damper 33 is completely opened to allow the air supplied by the blower 38 to pass through the condenser 32. In the internal cycle, the refrigerant compressed by the compressor 21 is supplied to the condenser 32 through the solenoid valve 34. At the condenser 32, the compressed refrigerant dissipates the heat. The air passing through the condenser 32 is heated accordingly. The refrigerant out of the condenser 32 is then supplied to the receiver tank 25 through the check valve 35. The refrigerant out of the receiver tank 25 is supplied to the evaporator 31 through the solenoid valve 36 and the expansion valve 37. The refrigerant vaporizes at the evaporator 31, dehumidifying the air.

In the internal cycle, the outdoor heat exchanger 22 is not operated. In such a case, no heat is absorbed from the air outside the automobile. The heating capacity corresponds to the power consumed by the compressor 21. The entire amount of the refrigerant is supplied to the evaporator 31 that serves to dehumidify the air. Therefore, a higher dehumidification capacity is achieved. In other words, the dehumidification capacity is high, but the heating capacity is low.

The control is carried out according to the present invention in the automobile air-conditioner capable of switching the operating cycles.

Figure 10:
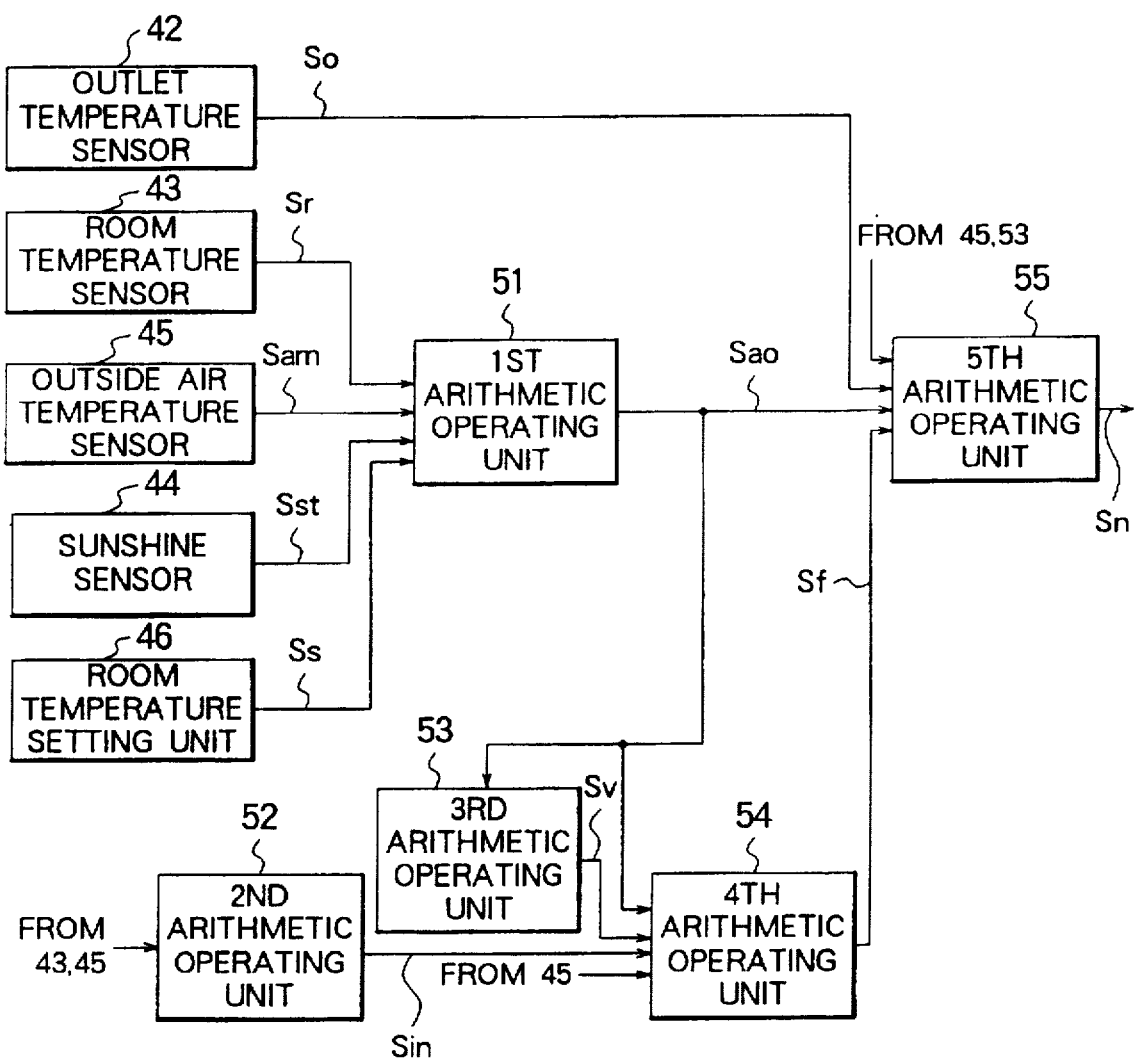
FIG. 10 is a block diagram of a control unit of the automobile air-conditioner according to the present invention.

Referring to FIG. 10, the automobile air-conditioner further comprises a room temperature setting unit 46 and first through fifth arithmetic operating units 51 through 55. In addition, the automobile air-conditioner comprises a switching damper (not shown) for use in determining a proportion of the outside air and the room air to be introduced into the ventilation duct. This proportion 18 indicated by a position Pd of the switching damper. The conditioner can thus obtain a signal indicative of the position Pd. As described above in conjunction with FIG. 1, the outlet temperature sensor 41 senses an outlet temperature TO and produces a sensor signal So indicative of the outlet temperature TO. The room temperature sensor 43 senses a room temperature Tr and produces a sensor signal Sr indicative of the room temperature Tr. The outside air temperature sensor 45 senses an outside air temperature Tam and produces a sensor signal Sam indicative of the outside air temperature Tam. The sunshine sensor 44 senses a quantity of solar radiation Tst and produces a sensor signal Sst indicative of the quantity of the solar radiation Sst. The room temperature setting unit 46 produces a setting signal Ss indicative of a set temperature Ts.

The sensor signals Sr, Sam, and Sst and setting signal Ss are supplied to a first arithmetic-operating unit 51. The first arithmetic operating unit 51 is for calculating a target temperature TAO according to the following equation and produces a signal Sao indicative of the calculated target temperature TAO:

$$TAO = Ks \cdot Ts - Kr \cdot Tr - Kam \cdot Tam - Kst \cdot Tst + C,$$

wherein Ks, Kr, Kam, and Tam represent coefficients while C represents a correction constant. The signal Sao is supplied to the third through fifth arithmetic operating units 53 through 55. The arithmetic operation so far is substantially the same as the conventional one described in conjunction with FIG. 1. The quantity of the solar radiation Tst may be omitted in the arithmetic operation carried out by the first arithmetic operating unit 51.

The second arithmetic operating unit 52 is for carrying out an arithmetic operation to estimate the temperature of the air introduced into the ventilation duct 30. The second arithmetic operating unit 52 carries out the operation according to the room temperature Tr, the outside air temperature Tam, and the position Pd of the switching damper to calculate an estimated air temperature Tin. The second arithmetic operating unit 52 produces a signal Sin indicative of the estimated air temperature Tin.

The third arithmetic operating unit 53 is for calculating a voltage applied to the blower 38. The third arithmetic operating unit 53 carries out a predetermined operation by using the target temperature TAO to calculate an apply voltage Vb to the blower 38. The third arithmetic operating unit 53 produces a signal Sv indicative of the apply voltage Vb.

The fourth arithmetic operating unit 54 is for carrying out an arithmetic operation to predict the rotation speed of the compressor 21. This operation may be called an arithmetic feed-forward operation. The fourth arithmetic operating unit 54 carries out a predetermined arithmetic operation by using a quantity V of the air to be passed through the evaporator 31 or the condenser 32, the target temperature TAO, the outside air temperature Tam, the estimated air temperature Tin obtained by the second arithmetic operating unit 52, and the apply voltage Vb obtained by the third arithmetic operating unit 53. The fourth arithmetic operating unit 54 then produces a predicted rotation speed FFc and produces a signal Sf indicative of the predicted rotation speed FFc.

The predetermined arithmetic operation is carried out by the fourth arithmetic-operating unit 54 in the following manner.

The following equation is used in the cooling cycle:

$$\begin{aligned}FFc &= f_1(Tam, Tin, TAO, Vb)\\ &= L_1\{1 - L_2 \cdot Tam - L_3 \cdot Tin - L_4 \cdot Vb + \\ &\quad L_5(C_2 + L_6 \cdot V + L_7 \cdot Tam - L_8 \cdot Tam^2) \times \\ &\quad (Tin - TAO)\}\end{aligned}$$

wherein $V = (1-\alpha) \times Kv \times Vb + Cv$, and $\alpha = 0$.

The following equation is used in the heating cycle:

$$\begin{aligned}FFc &= f_2(Tam, Tin, TAO, Vb)\\ &= K_1\{1 - K_2 \cdot Tam - K_3 \cdot Tin - K_4 \cdot Vb + \\ &\quad K_5(C_1 + K_6 \cdot V + K_7 \cdot Tam + K_8 \cdot Tam^2) \times \\ &\quad (Tin - TAO)\}\end{aligned}$$

wherein $V = \alpha \times Kv \times Vb + Cv$, and $\alpha = 1$.

In the above arithmetic expressions, $C_1$, $C_2$, and Cv are correction constants. Coefficients $K_1$ through $K_8$ and $L_1$ through $L_8$ are determined depending on design specifications for the automobile air-conditioner. Table 1 shows relationships between the design specifications and coefficients. In the table, $\alpha$ represents a ratio of the air passed through the evaporator 31 to that passed through the condenser 32, which is changed depending on the amount of opening of the damper 33. In the heating cycle, the value of $\alpha$ is determined in the following manner with the damper half opened. A value larger than 0 and smaller than 1 is substituted in $\alpha$.

TABLE 1

| COEFFI-CIENTS | DESIGN SPECIFICATIONS | HEATING | COOLING |
|---|---|---|---|
| $K_1$ | DISCHARGE | REDUCE $K_1$ | REDUCE $L_1$ |
| $L_1$ | CAPACITY PER ONE ROTATION | DUE TO INCREASE IN VOLUME | DUE TO INCREASE |

TABLE 1-continued

| COEFFI-CIENTS | DESIGN SPECI-FICATIONS | HEATING | COOLING |
|---|---|---|---|
| | OF COMPRESSOR | | IN VOLUME |
| $K_2, K_7, K_8$ $L_2, L_7, L_8$ | HEAT EXCHANGE CAPACITY OF OUTDOOR HEAT EXCHANGER | REDUCE $K_2, K_7, K_8$ DUE TO INCREASE IN CAPACITY | INCREASE $L_2, L_7, L_8$ DUE TO INCREASE IN CAPACITY |
| $K_3, K_5$ | HEAT EXCHANGE CAPACITY OF INDOOR CONDENSER | REDUCE $K_3, K_5$ DUE TO INCREASE IN CAPACITY | — |
| $L_3, L_5$ | HEAT EXCHANGE CAPACITY OF INDOOR EVAPORATOR | — | INCREASE $L_3, L_5$ DUE TO INCREASE IN CAPACITY |
| $K_6$ $L_6$ | QUANTITY OF AIR FROM BLOWER PER APPLY VOLTAGE | REDUCE $K_6$ DUE TO INCREASE IN QUANTITY OF AIR | REDUCE $L_6$ DUE TO INCREASE IN QUANTITY OF AIR |

In the dehumidification/cooling cycle, the coefficients in the arithmetic expression used in the cooling cycle are modified. Likewise, the coefficients in the arithmetic expression used in the heating cycle are modified in the dehumidification/heating cycle.

The fifth arithmetic operating unit 55 is for calculating the rotation speed Nc of the compressor 21 to be controlled actually. The fifth arithmetic operating unit 55 supplies the rotation speed obtained by the calculation to the compressor 21 as a rotation speed command. The fifth arithmetic operating unit 55 carries out an arithmetic operation to calculate the rotation speed Nc of the compressor 21 according to the following arithmetic feedback control expression by using the target temperature TAO, the predicted rotation speed FFc, the outlet temperature TO, the quantity V of the air, and the outside air temperature Tam. The following equation is a combination of the predicted rotation speed FFc and an arithmetic PI control expression. However, the arithmetic PI control expression may be replaced by an arithmetic PID control expression. The outlet temperature TO is the temperature sensed by the first outlet temperature sensor 41 in the cooling and dehumidification/cooling cycles. On the other hand, the outlet temperature TO is the temperature sensed by the second outlet temperature sensor 42 in the heating and internal cycles.

$$Nc = FFc \pm P + I$$
$$= FFC \pm G \cdot Kpc(TO - TAO) + I_n$$
$$I_n = I_{n-1} \pm G \cdot Kpc \cdot \Delta t/Ki \cdot (TO - TAO)$$
$$G = f(Vb, Tam),$$

wherein Kpc represents a fundamental gain in the arithmetic expression for the rotation speed Nc, G represents a correction gain in the arithmetic expression for the rotation speed Nc, $\Delta t$ represents a modified cycle of the output, and Ki represents an integration time in the arithmetic expression for the rotation speed Nc. The sign ± indicates the following. The plus sign (+) is used in the cooling or the dehumidification/cooling cycle and the minus sign (−) is used in the heating, the dehumidification/heating or the internal cycle. A necessary dehumidification temperature TD may be used in place of the target temperature TAO in the dehumidification/cooling cycle. In such a case, the necessary dehumidification temperature may be, for example, 3° C.

The correction gain G is obtained by the following equation, depending on the various conditions including the heat load.

The correction gain G is given as follows in the cooling cycle:

$$G = f(Vb, Tam) = C_4 L_9 \cdot Tam - L_{10} \cdot Tam^2 + L_{11} \cdot Vb.$$

The coefficients differ in the dehumidification/cooling cycle.

The correction gain G is given as follows in the heating cycle:

$$G = f(Vb, Tam)$$
$$= C_3 + K_9 \cdot Tam - K_{10} \cdot Tam^2 + K_{11} \cdot Vb.$$

The coefficients differ in the dehumidification/heating and internal cycles.

As apparent from the above, the arithmetic feedback control expression is the arithmetic PI or PID control expression. The gain in this arithmetic feedback control expression is calculated according to a function with the quantity of the air passed through the evaporator 31 or the condenser 32 used as a variable. In other words, the gain is controlled automatically.

Coefficients $K_9$ through $K_{11}$ and $L_9$ through $L_{11}$ are determined depending on design specifications for the automobile air-conditioner. Table 2 shows illustrates relationships between the design specifications and the coefficients.

TABLE 2

| COEFFI-CIENTS | DESIGN SPECI-FICATIONS | HEATING | COOLING |
|---|---|---|---|
| $K_9, K_{10}$ $L_9, L_{10}$ | HEAT EXCHANGE CAPACITY OF OUTDOOR HEAT | REDUCE $K_9, K_{10}$ DUE TO INCREASE IN CAPACITY | INCREASE $L_9, L_{10}$ DUE TO INCREASE |

TABLE 2-continued

| COEFFI-CIENTS | DESIGN SPECI-FICATIONS | HEATING | COOLING |
|---|---|---|---|
| $K_{11}$<br>$L_{11}$ | EXCHANGER QUANTITY OF AIR FROM BLOWER PER APPLY VOLTAGE | REDUCE $K_{11}$ DUE TO INCREASE IN QUANTITY OF AIR | IN CAPACITY REDUCE $L_{11}$ DUE TO INCREASE IN QUANTITY OF AIR |

The above mentioned arithmetic operations provides the rotation speed Nc of the compressor 21. The rotation speed of the compressor 21 is controlled according to the rotation speed Nc.

Figure 11:
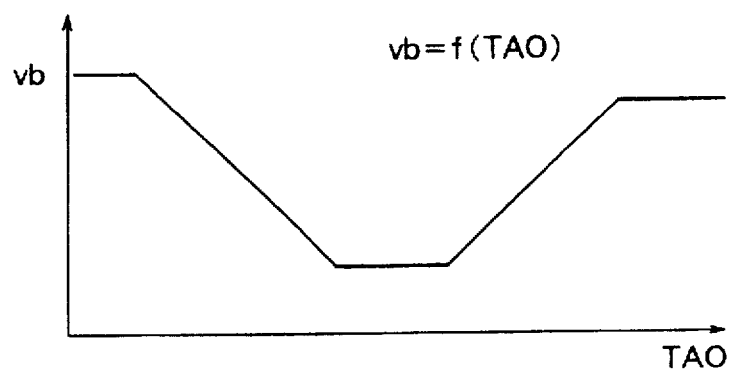
FIG. 11 is a graphical representation of a voltage Vb applied across a blower shown in FIG. 4 as a function of a target temperature TAO.

In the above-mentioned control, the apply voltage Vb to the blower 38 and the target temperature TAO generally have a relationship illustrated in FIG. 11.

Figure 12:
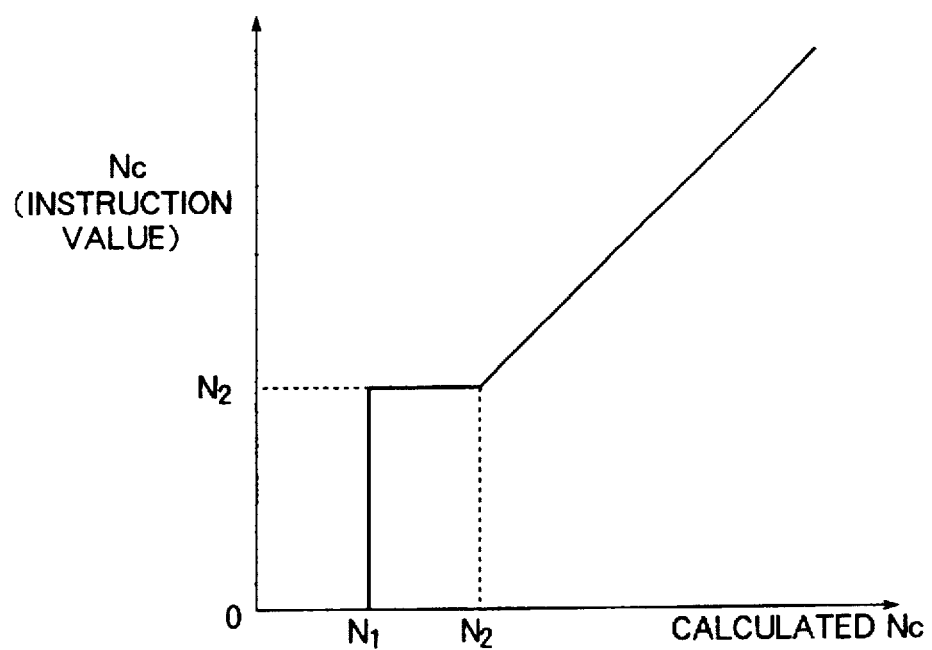
FIG. 12 is a characteristic curve obtained for use in describing an example of control carried out by the control unit according to the present invention when a compressor is operated at a low rotation speed.

It is difficult in practice to control the compressor 21 at a very low rotation speed when the value of the rotation speed Nc obtained by the arithmetic operation is considerably small. In such a case, the compressor 21 is stopped when the value of the rotation speed Nc obtained by the arithmetic operation is smaller than a first set value N1, as shown in FIG. 12. A second set value N2 is used as the rotation speed Nc of the compressor 21 when the rotation speed Nc obtained by the calculation is between the first set value N1 and the second set value N2.

Figure 13:
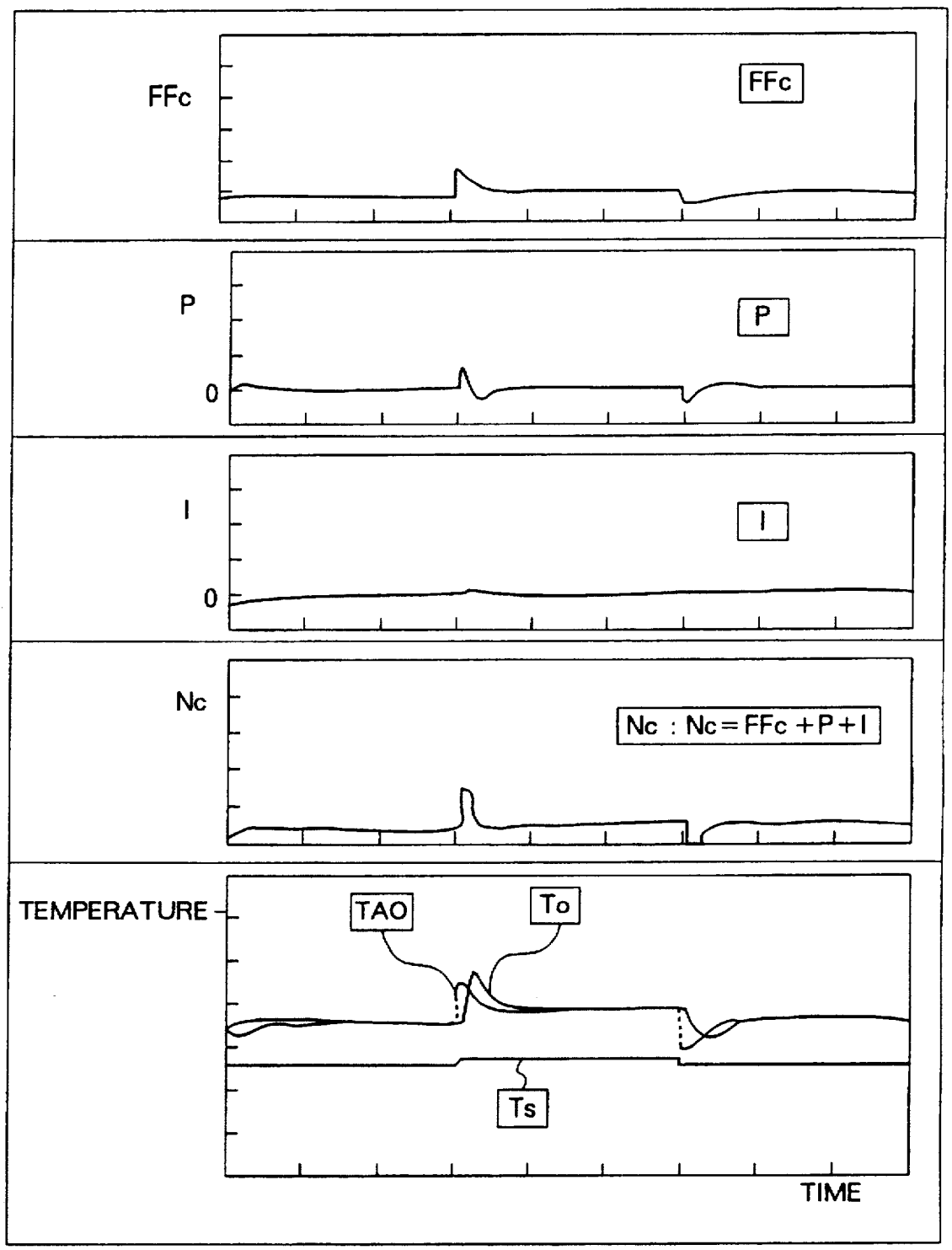
FIG. 13 illustrates characteristic curves for use in describing an example of control carried out by the control unit according to the present invention when the automobile air-conditioner is operated under the light load for heating.
Figure 14:
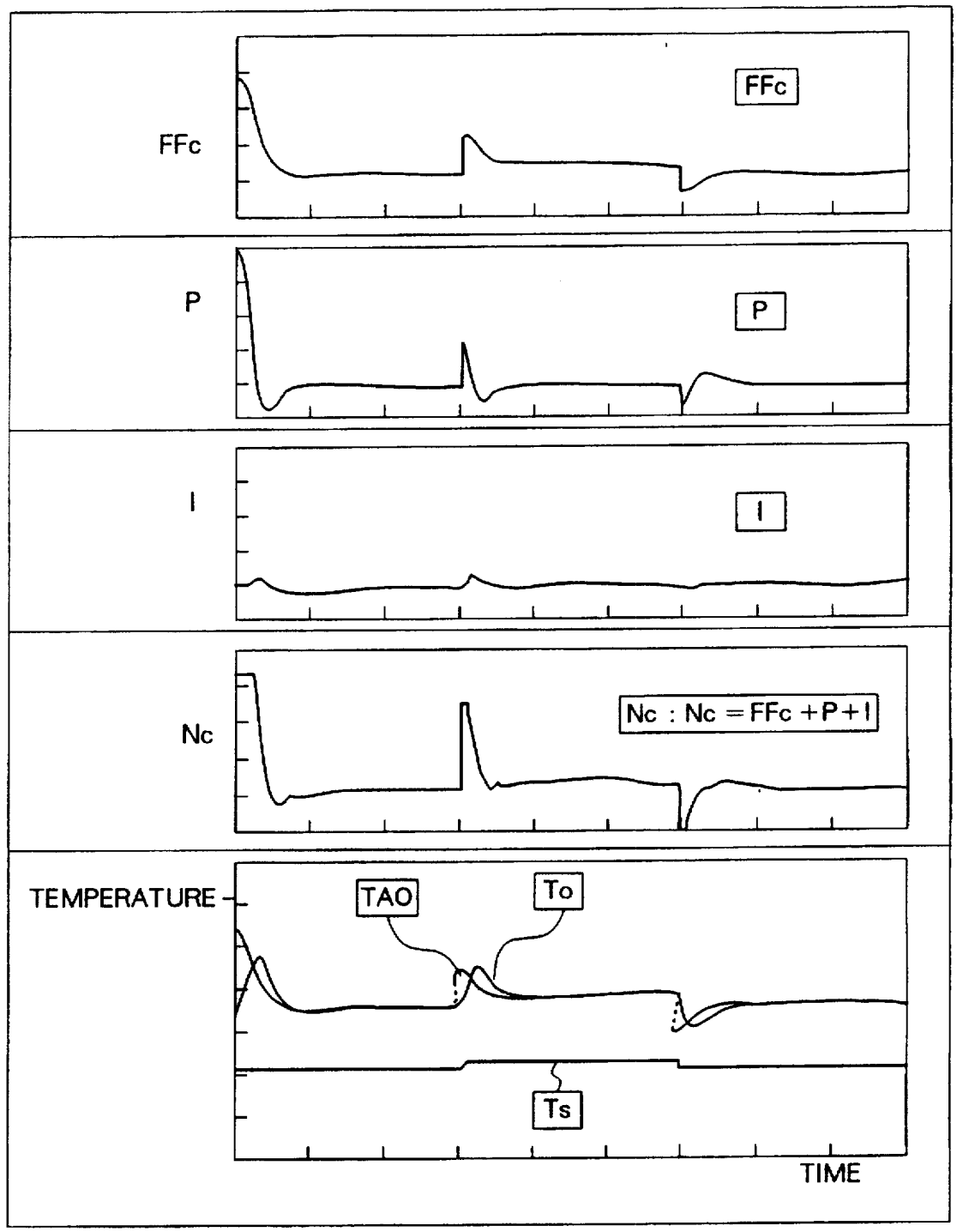
FIG. 14 illustrates characteristic curves for use in describing an example of control carried out by the control unit according to the present invention when the automobile air-conditioner is operated under the heavy load for heating.

FIGS. 13 and 14 illustrate characteristic curves of control obtained when the compressor 21 is controlled by the rotation speed Nc obtained by the above mentioned arithmetic operations. FIG. 13 illustrates characteristic curves of control carried out when the automobile air-conditioner is operated under the light load for heating. This control characteristic is stable and exhibits no hunting. In addition, the control characteristic provides a high response speed even upon the change in the set temperature Ts.

FIG. 14 illustrates characteristic curves of control carried out when the automobile air-conditioner is operated under the heavy load for heating. This control characteristic is stable and provides the high response speed even upon the change in the set temperature Ts.

In the automobile air-conditioner according to the present invention, the rotation speed Nc of the compressor 21 is calculated based on both the arithmetic expression for use in predicting the predicted rotation speed FFc depending on the driving conditions and the arithmetic feedback control expression for use in feeding back the sensed outlet temperature.

The predicted rotation speed FFc is calculated by using, as variables, the outside air temperature Tam, the room temperature Tr, the quantity Tst of the solar radiation, the set temperature Ts obtained by the room temperature setting unit, the apply voltage Vb to the blower 38 obtained according to the above values, and target temperature, etc. When any one of these values are changed, then the optimum rotation speed is calculated immediately depending on that change. As a result, a more high response speed to the heat load can be obtained. In addition, the value obtained by the arithmetic feedback control expression is reflected to the predicted rotation speed FFc obtained according to the arithmetic operation for the prediction. Therefore, the rotation speed of the compressor 21 is controlled to the optimum value with high accuracy and rapid response.

Furthermore, it becomes possible to adjust the gain to the optimum value depending on the change in the heat load by controlling the gain of the PI control or the PID control in the arithmetic feedback control expression depending on the outside air temperature Tam or the quantity V of the air passed through the radiator or the heat sink. This provides a stable, excellent control characteristic with the high response speed.

What is claimed is:

1. An automobile air-conditioner comprising a compressor with variable discharge capacity for compressing a refrigerant; a refrigerant circulation circuit placed in a ventilation duct and including at least one of a heat sink adapted to absorb heat during cooling and a radiator adapted to provide heat transfer to objects during heating; an outlet temperature sensor for sensing the air temperature at an outlet of said at least one of the heat sink and the radiator as a sensed outlet temperature; a room temperature sensor for sensing the temperature inside the automobile as a sensed room temperature; an outside air temperature sensor for sensing the temperature outside the automobile as a sensed outside air temperature; and a room temperature setting unit for use in setting the room temperature to a desired temperature, wherein the automobile air-conditioner further comprises:

a first arithmetic operating unit that carries out an arithmetic operation according to at least the sensed room temperature, the sensed outside air temperature, and the desired temperature, to obtain a target temperature;

a second arithmetic operating unit that carries out an arithmetic operation for predicting the rotation speed of the compressor with a predetermined feed-forward arithmetic expression to obtain a predicted rotation speed; and a third arithmetic operating unit that carries out an arithmetic operation with an arithmetic feedback control expression including the predicted rotation speed and a deviation between the target temperature and the sensed outlet temperature to obtain the rotation speed of the compressor, the compressor being controlled according to the rotation speed calculated by the third arithmetic operating unit.

2. An automobile air-conditioner as claimed in claim 1 further comprising a sunshine sensor for sensing the quantity of solar radiation as a sensed quantity of solar radiation, said first arithmetic operating unit carrying out an arithmetic operation according to the sensed quantity of solar radiation in addition to the sensed room temperature, the sensed outside air temperature, and the desired temperature, to obtain the target temperature.

3. An automobile air-conditioner as claimed in claim 2, wherein said second arithmetic operating unit calculates the predicted rotation speed according to at least one of the sensed room temperature, the sensed outside air temperature, the desired temperature, and the sensed quantity of solar radiation.

4. An automobile air-conditioner as claimed in claim 3, wherein said second arithmetic operating unit calculates the predicted rotation speed according to at least one of the target temperature, the sensed outside air temperature, the air temperature at an inlet of the ventilation duct estimated by the sensed outside air temperature and the sensed room temperature, and the quantity of air passed through at least one of the radiator and the heat sink.

5. An automobile air-conditioner as claimed in any one of claims 1 through 4, wherein said arithmetic feedback control expression is either an arithmetic PI control expression or an arithmetic PID control expression.

6. An automobile air-conditioner as claimed in claim 5, wherein a gain is set for the arithmetic feedback control expression, the gain being calculated by a function with at least the sensed outside air temperature and the quantity of air being used as variables.

* * * * *

UNITED STATES PATENT AND TRADEMARK OFFICE
CERTIFICATE OF CORRECTION

PATENT NO.  : 5,765,383
DATED       : June 16, 1998
INVENTOR(S) : Inoue

It is certified that error appears in the above-identified patent and that said Letters Patent is hereby corrected as shown below:

| U.S. PATENT DOCUMENTS ||||||| | |
|---|---|---|---|---|---|---|---|---|
| DOCUMENT NAME ||||||| DATE | NAME |
| 4 | 8 | 3 | 2 | 2 | 5 | 8 | 5/89 | Hoshino et al. |
| 4 | 2 | 8 | 9 | 1 | 9 | 5 | 9/81 | Bellot et al |
| 4 | 3 | 2 | 6 | 3 | 8 | 6 | 4/82 | Tamura |
| 4 | 3 | 2 | 8 | 8 | 5 | 5 | 5/82 | Iwata et al. |
| 4 | 3 | 3 | 7 | 8 | 2 | 1 | 7/82 | Saito |
| 4 | 3 | 4 | 4 | 5 | 6 | 5 | 8/92 | Kojima et al. |
| 4 | 3 | 4 | 5 | 7 | 1 | 4 | 8/82 | Kojima |
| 4 | 4 | 7 | 1 | 6 | 3 | 2 | 9/84 | Nishi et al. |
| 4 | 4 | 9 | 4 | 1 | 8 | 4 | 1/85 | Crevel |

UNITED STATES PATENT AND TRADEMARK OFFICE
CERTIFICATE OF CORRECTION

PATENT NO. : 5,765,383
DATED : June 16, 1998
INVENTOR(S) : Inoue

It is certified that error appears in the above-identified patent and that said Letters Patent is hereby corrected as shown below:

| U.S. PATENT DOCUMENTS | | | | | | | | |
|---|---|---|---|---|---|---|---|---|
| DOCUMENT NAME | | | | | | | DATE | NAME |
| 4 | 5 | 3 | 7 | 2 | 4 | 5 | 8/85 | Nishimura et al. |
| 4 | 3 | 3 | 9 | 8 | 2 | 1 | 9/85 | Tamura |
| 5 | 3 | 1 | 5 | 8 | 4 | 1 | 5/94 | Inoue |
| 5 | 3 | 4 | 1 | 6 | 5 | 1 | 8/94 | Inoue |

Signed and Sealed this

Ninth Day of February, 1999

Attest:

Attesting Officer

Acting Commissioner of Patents and Trademarks